July 18, 1939.  D. I. DU BOIS  2,166,428
METHOD AND APPARATUS FOR TREATMENT OF GLASS AND SIMILAR WARE
Original Filed Aug. 23, 1934  10 Sheets-Sheet 6

INVENTOR
David I. Du Bois
by his attorneys
Byrnes, Stebbins & Blenko July 18, 1939. D. I. DU BOIS 2,166,428
METHOD AND APPARATUS FOR TREATMENT OF GLASS AND SIMILAR WARE
Original Filed Aug. 23, 1934 10 Sheets-Sheet 7

INVENTOR
David I. Du Bois
by his attorneys
Byrnes, Stebbins & Blenko

July 18, 1939.   D. I. DU BOIS   2,166,428
METHOD AND APPARATUS FOR TREATMENT OF GLASS AND SIMILAR WARE
Original Filed Aug. 23, 1934   10 Sheets-Sheet 10

INVENTOR
David I. Du Bois
by his attorneys
Byrnes, Stebbins & Blenko

Patented July 18, 1939

2,166,428

UNITED STATES PATENT OFFICE 2,166,428

METHOD AND APPARATUS FOR TREATMENT OF GLASS AND SIMILAR WARE

David Irvin Du Bois, Millville, N. J., assignor, by mesne assignments, to Armstrong Cork Company, Manheim Township, Lancaster County, Pa., a corporation of Pennsylvania Application August 23, 1934, Serial No. 741,042
Renewed June 22, 1938

18 Claims. (Cl. 41—9)

My invention relates to the treatment of glassware and similar articles and, in particular, to the provision of a suitable finish on the surface thereof.

For certain uses, it is desirable that glassware such as bottles and the like have a frosted or etched surface. Heretofore, this surface finish has been provided by sand blasting or dipping the articles in an acid bath. In both cases, the operations have been performed manually. Such processes are objectionable because they necessitate the exposure of employees to noxious fumes and injurious abrasives, aside from the fact that the rate of production obtainable therewith is quite limited. The uniformity of the product also leaves a great deal to be desired, because of the variable human factor which determines the extent of the treatment and the character of the finish obtained.

In the acid dipping process, furthermore, there are additional variables such as the temperature of the solution, the state of equilibrium thereof, the length of time the articles are allowed to stand before washing, the temperature of the articles upon immersion and numerous others.

I have invented a method and apparatus for the treatment of glassware to provide a frosted or etched finish which overcomes the objections to the manual processes used heretofore for that purpose. In accordance with my invention, I provide travelling means for supporting the glassware during the several stages of treatment, the travelling means being adapted to move past fixed stations where the successive steps of the process are performed in a continuous, progressive manner. At the first station, the etching solution is sprayed on the articles. At the second station the articles are subjected to a wash spray of cold water. At the third station the articles are given a hot water wash, and at the fourth station, they are finally dried. I provide means for maintaining the etching solution at a predetermined temperature and for insuring uniformity of the solution at all times by continuous agitation thereof.

Further details of the construction and operation incident to a preferred embodiment and practice of the invention will become apparent as the following description proceeds. The accompanying drawings illustrate a preferred embodiment of the apparatus involved in my invention and indicate structurally the successive steps of the method. In the drawings—

Figure 8 is a partial side elevation of the machine taken from the side opposite to that from which
Figure 3 is taken.

Figure 1:
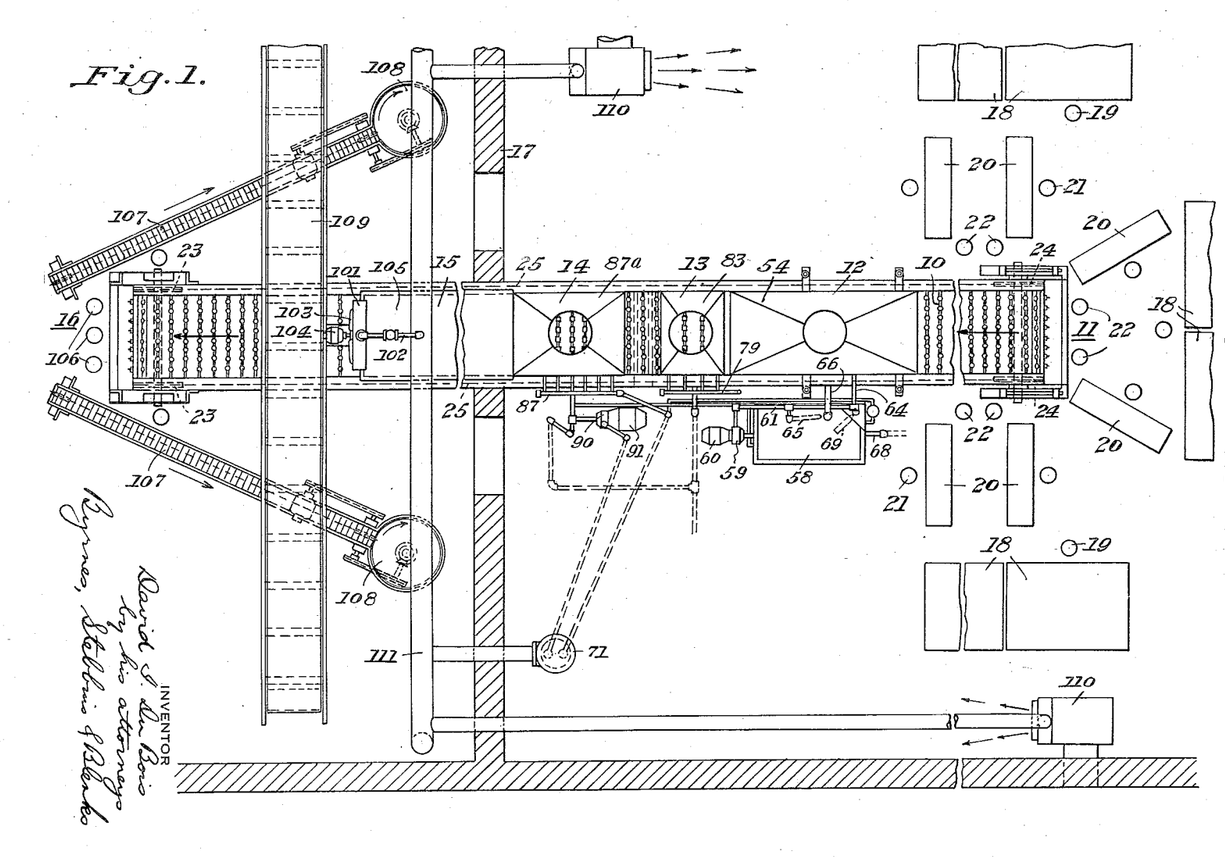
Figure 1 is a plan view of the apparatus.
Figure 2:
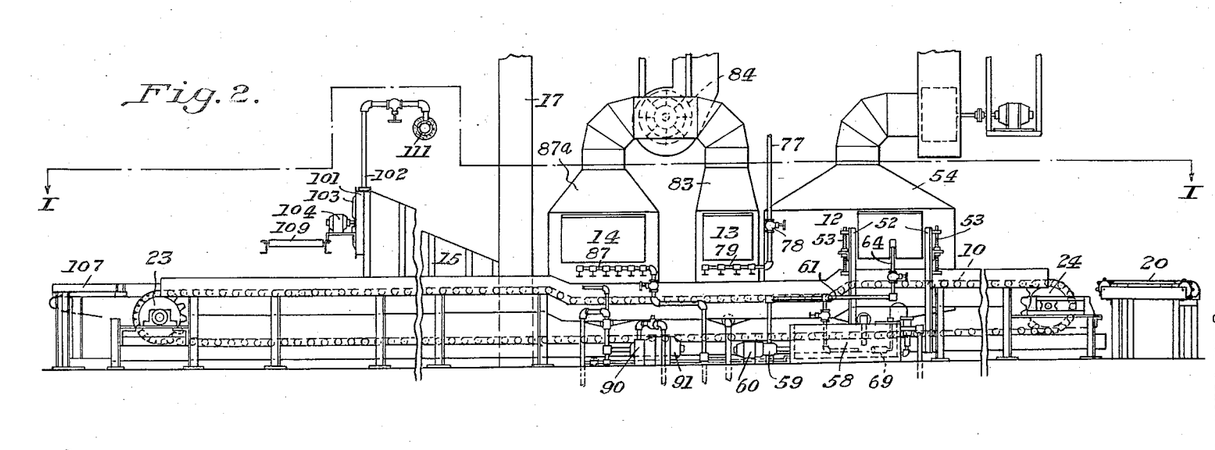
Figure 2 is a side elevation thereof.

Referring now in detail to the drawings, and for the present, to Figures 1 and 2, the apparatus of my invention comprises in general a travelling conveyor 10 extending from a loading station 11 through a spray zone or station 12, and a cold washing station 13, a hot washing station 14 and a drying station 15, to an unloading station 16. The drying and unloading stations are preferably located on one side of a dividing partition wall 17, and the remaining apparatus on the other side of the wall.

The ware to be treated, for example, bottles, is delivered to points adjacent the loading station 11 on skids 18. Operators stationed at 19 remove the bottles from the skids and deliver them to portable conveyors 20 directed toward the loading station 11. If it is desired that a certain portion of the product being treated remain clear and unfrosted, shields of suitable size and shape are attached to the articles by operators at 21, as they move along the conveyors 20. If the ware is to be frosted or etched all over, the operators at 21 are not necessary.

Figure 13:
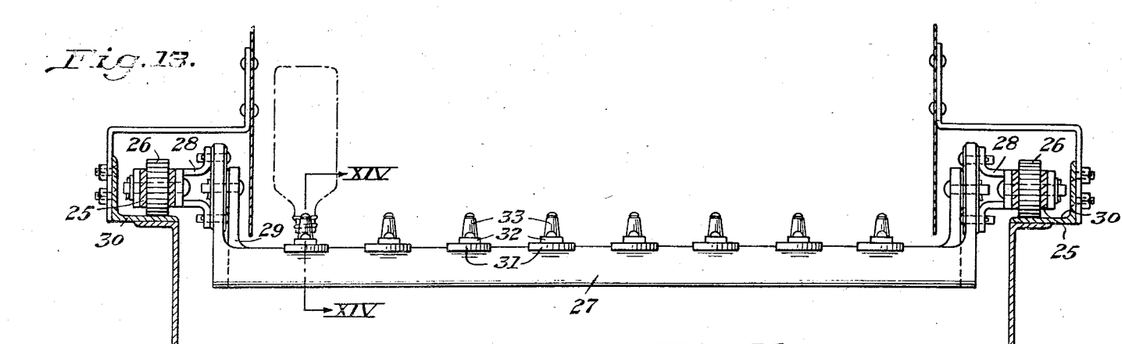
Figure 13 is a partial transverse sectional view taken through the machine, showing the details of construction of the ware conveyor.

The articles to be etched are placed on the conveyor 10 by operators positioned at 22. The conveyor 10 extends around driving and idler sprockets 23 and 24 adjacent opposite ends of the machine. The conveyor comprises a pair of chains 25 (see Figures 7 and 13) having supporting rollers 26 journaled between the links thereof. Cross rails 27 are secured to brackets 28 extending inwardly from alternate sets of chain links. Similar cross rails 29 are carried between adjacent rails 27. The rollers 26 travel on tracks 30 extending the length of the machine. The return run of the conveyor is supported on similar tracks adjacent the floor.

Figure 14:
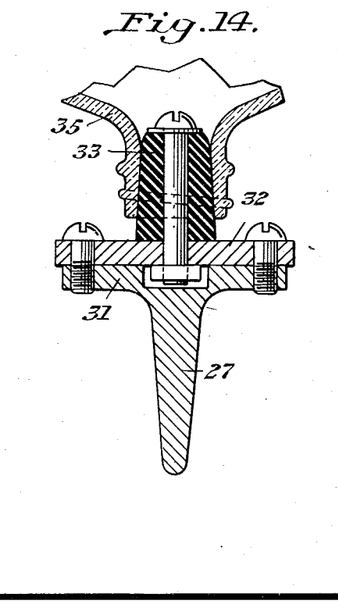
Figure 14 is a sectional view along the line XIV—XIV of Figure 13.
Figure 15:
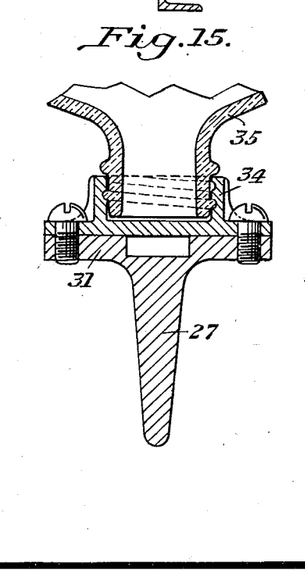
Figure 15 is a view showing a modified form of construction.
Figure 16:
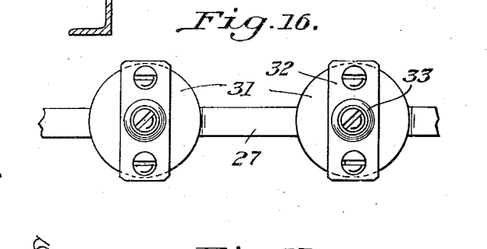
Figure 16 is a partial plan view of a cross rail forming part of the ware conveyor.
Figure 17:
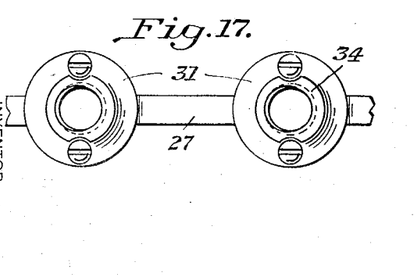
Figure 17 is a similar view of a modified form of the rail.

The cross rails 27 and 29 have spaced pads 31 to which are bolted plates 32. The plates 32, as shown in Figure 14, have a ware supporting pin 33, preferably of rubber or some such resilient material, secured thereto. Alternatively, the plates 32 may have a threaded cup 34 extending upwardly therefrom, as shown in Figure 15, into which the ware indicated at 35, may be screwed.

Figure 7:
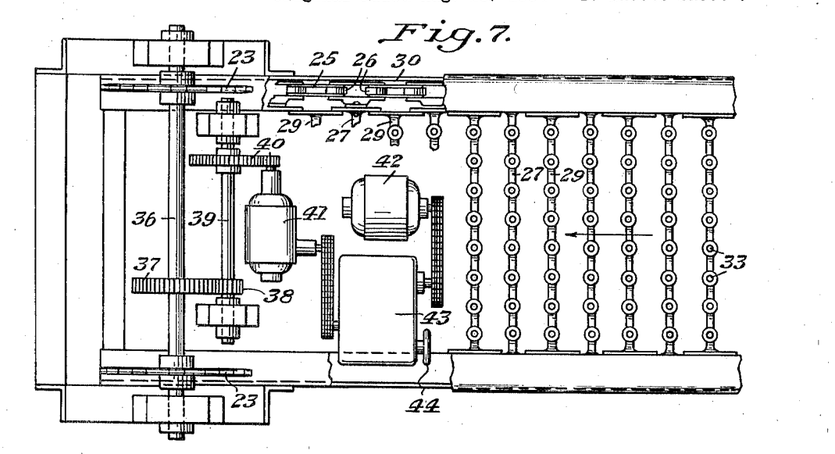
Figure 7 is a plan view of the apparatus at the exit end, parts being broken away to expose the drive for the travelling ware supporting means.

The drive for the conveyor is best shown in Figure 7. The sprockets 23 are carried on a shaft 36 having a spur gear 37 meshing with a pinion 38, and an intermediate shaft 39. A second spur reduction gearing 40 connects the shaft 39 to a worm reduction gear 41. A driving motor 42 operates the worm reduction gearing 41 through a variable speed drive 43 having an adjusting hand wheel 44, the variable speed drive being connected by chain belts to the motor and the worm reduction gearing. The motor is a constant speed device and the conveyor 10, therefore, moves at a constant speed which can be varied through the drive 43.

Figures 9, 10, 11, 12:
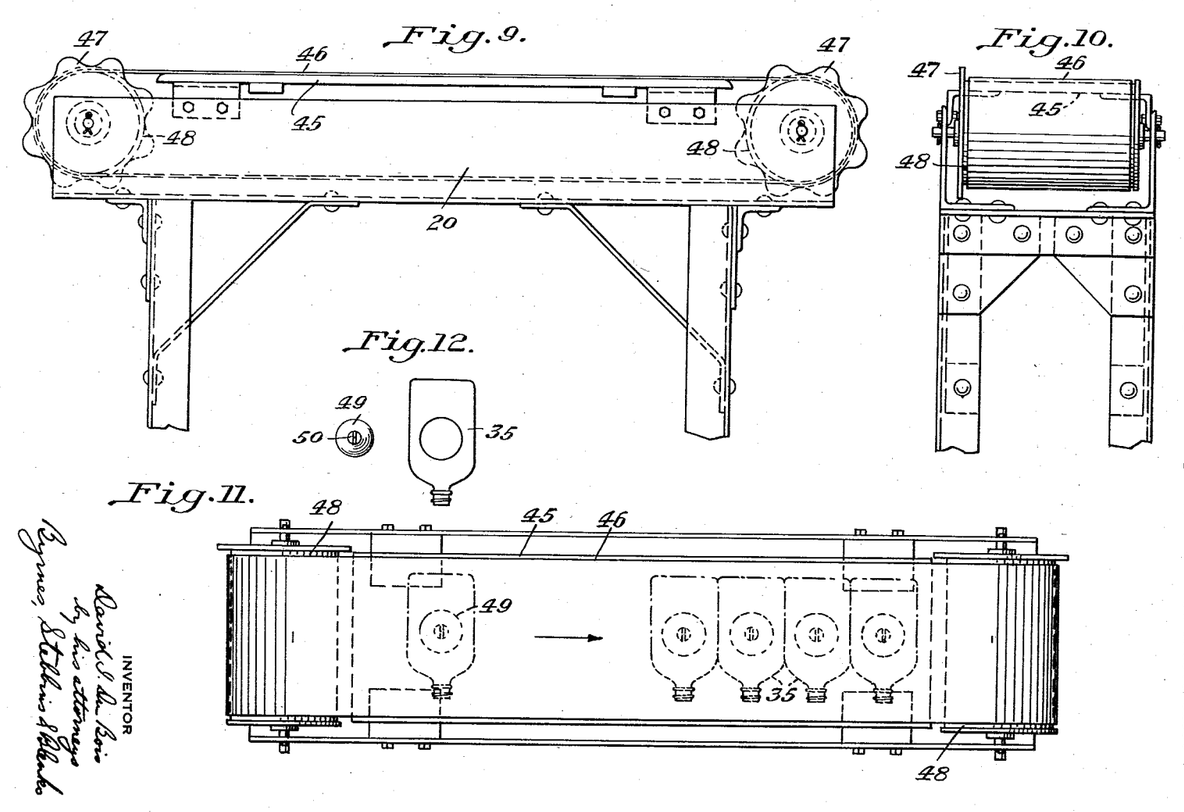
Figure 9 is a side elevation of a conveyor table which I prefer to use in loading of the ware conveyor.
Figure 10 is an end elevation thereof.
Figure 11 is a plan view thereof.
Figure 12 is a side elevation of a piece of ware and a shield adapted to be placed thereon, whereby a clear, unetched portion is left on the surface of the ware.

As the ware is delivered to the loading station, it is attached to the conveyor 10 by the operators at 22 in the manner indicated in Figure 14. The conveyor tables 20 are illustrated in detail in Figures 9 through 11. They comprise simply a frame having a top 45 over which a continuous belt 46 may be moved by hand wheels 47. The hand wheels are formed on sheaves 48 over which the belt 46 is trained. The conveyor 46 is moved by the operators stationed at 19, and as the conveyors advance, the operators at 21 apply the shields 49 to the bottles 35. This shield is in the form of a rubber vacuum cup, the ware-engaging face of which is suitably curved to fit the contour of the article. A slot 50 in a boss on the shield indicates the proper position of the shield relative to the bottle. After the shield has been properly positioned on the bottle, the latter is subsequently picked up by the operators at 22 and placed on the pins 33 of the conveyor as before explained.

Figure 3:
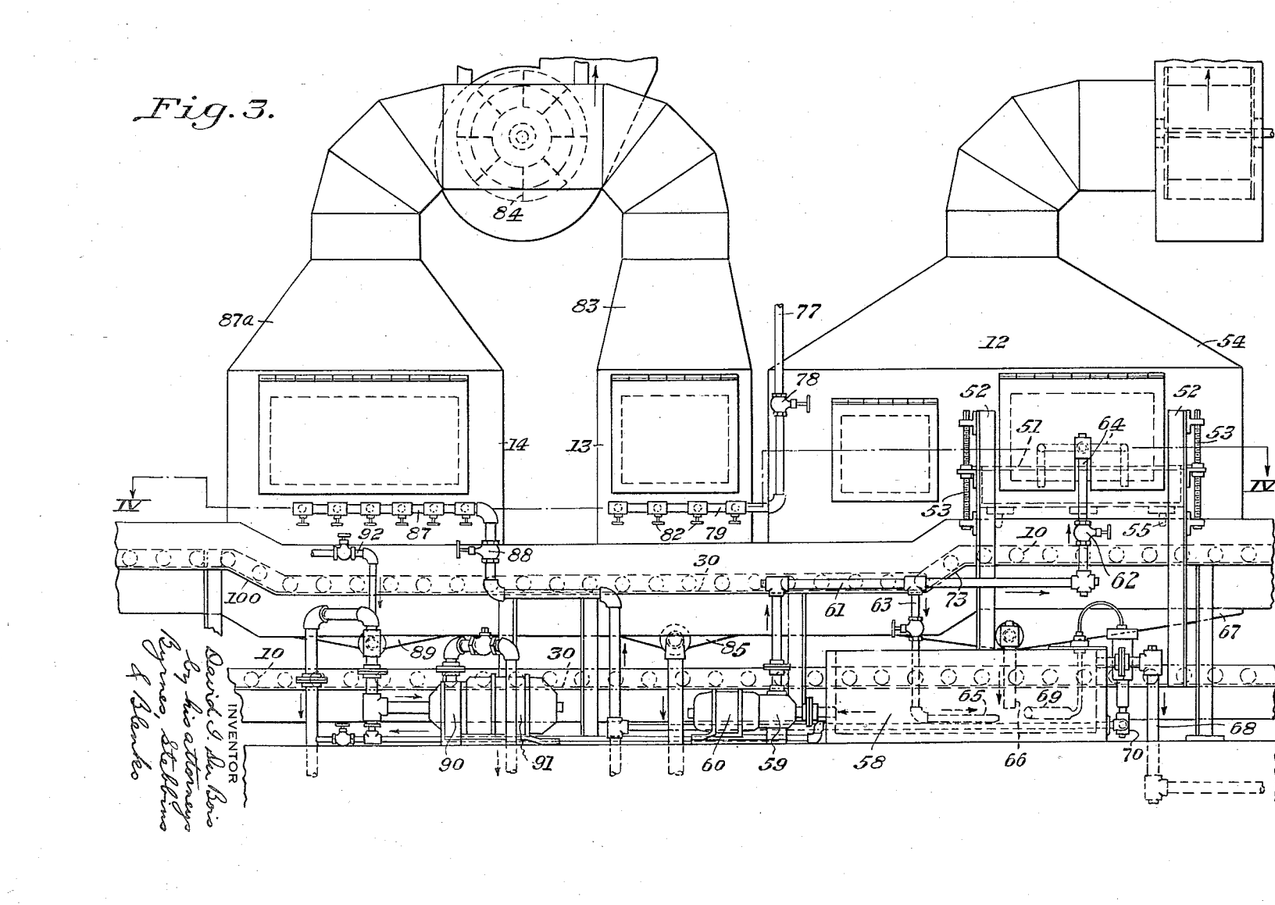
Figure 3 is a view similar to Figure 2 showing a portion thereof to enlarged scale.
Figure 8:
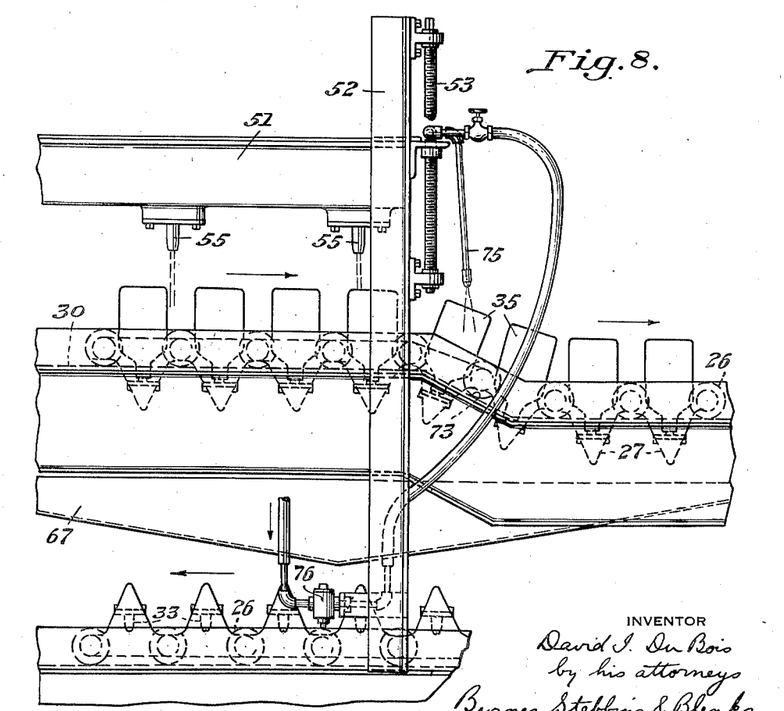

Movement of the conveyor 10 brings the ware thereon to the spraying station 12. A spray tank 51 is located above the conveyor 10 at the spray station 12. The tank 51, as shown in Figures 3 and 8, is adjustably supported on a structural frame 52 by screw jacks 53. A hood 54 communicating with an exhaust fan, is positioned above the spraying station.

Figures 18, 19:
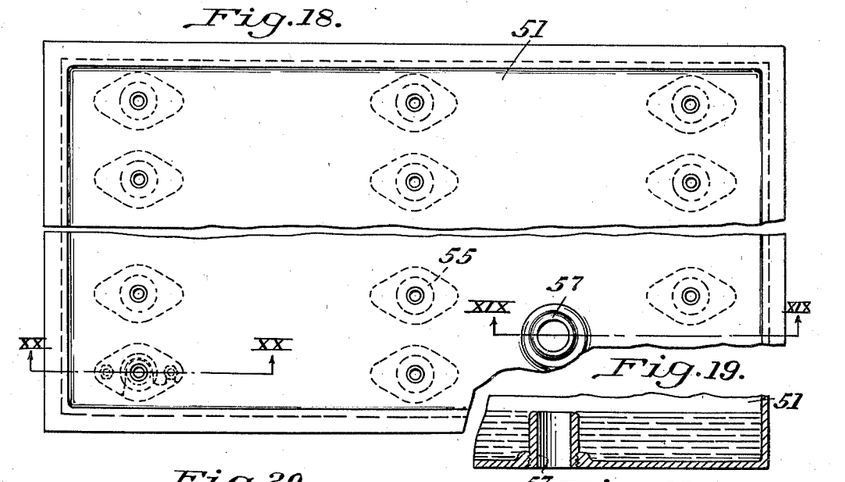
Figure 18 is a plan view of the etching spray tank.
Figure 19 is a sectional view along the line XIX—XIX of Figure 18.
Figure 20:
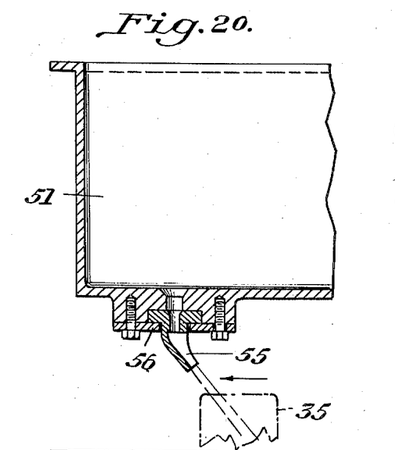
Figure 20 is a sectional view along the line XX—XX of Figure 18.
Figure 21:
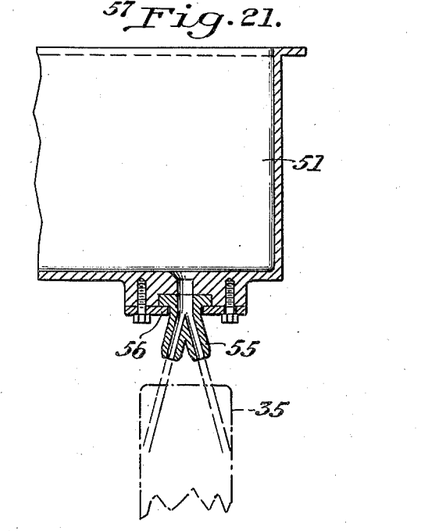
Figure 21 is a similar view showing a modified form of construction.
Figure 22:
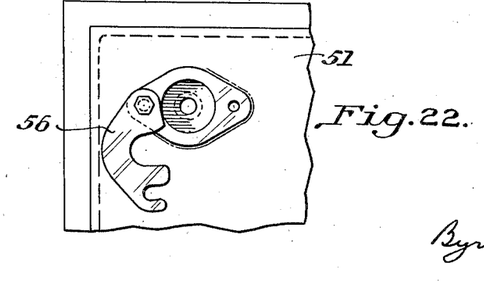
Figure 22 is a partial bottom plan view of a spray tank showing the manner of removably attaching spray nozzles thereto.

As shown in Figures 8 and 18, spray nozzles 55 are disposed in rows on the bottom of the tank 51 and extend downwardly therefrom toward the conveyor 10. The nozzles may be either straight, as shown in Figure 8, inclined as shown in Figure 20, or split as shown in Figure 21, depending on the size and shape of the ware being treated. The nozzles are removably secured to recessed bosses on the bottom of the tank by yokes 56.

An overflow port is provided in the bottom of the tank by a nipple 57 threaded therein. The height of the nipple, of course, controls the depth of etching solution maintained above the nozzles 55.

Etching solution is supplied to the tank 51 from a storage reservoir 58 by a pump 59 driven by a motor 60. Piping 61 including a control valve 62 and a tap-off 63, connects the pump 59 to a divided delivery conduit 64 extending down into the tank 51. The tap-off 63 guides etching solution to an agitating jet 65 terminating adjacent the end of a return conduit 66 extending into the reservoir 58 from the bottom of a collecting tank 67 disposed below the spray tank 51. The reservoir 58 has an overflow pipe 68.

In order to maintain the temperature of the etching solution at a constant value, I provide a thermostat 69 for automatically operating a valve 70 controlling the admission of hot water from a heater 71 to a heating jacket 72 disposed in the wall of the reservoir 58. The supply of hot water for heating the etching solution is thus controlled automatically to insure that the proper temperature is maintained. The water discharged from the heating jacket 72 is returned through suitable piping to the water heater by means which will be described later.

From what has been said, it will be apparent that the ware is subjected at the station 12 to repeated sprayings of etching solution, with a time interval between successive sprays, the etching solution being maintained in active circulation and at a constant temperature at all times, so that the ware is uniformly treated to provide the desired surface finish thereon. After running over the exposed surfaces of the ware, the solution is collected and returned to the storage reservoir.

On leaving the spraying station, the conveyor chain 10 moves down an inclined portion 73 of the track 30. As a result, the ware on the cross rails 27 and 29 is tilted as shown in Figure 8. This tilting has two effects. It first drains any spraying solution collecting in the depression formed in the bottom of the bottles 35 and, secondly, prevents streaking of the ware by causing the down-flowing solution to move laterally over the surface of the ware as well as vertically thereon. To aid in the removal of the etching solution from the depressions in the bottom of the ware, air jets 75 are supported on the tank 51. The delivery of air to the jet is controlled by an automatic valve 76 supported on the spray tank frame 52 so as to be operated by the rollers 26 of one of the conveyor chains 25.

As the sprayed ware moves away from the station 12, the solution drips therefrom into the collecting pan, leaving on the ware only a very thin film of the solution.

Figure 4:
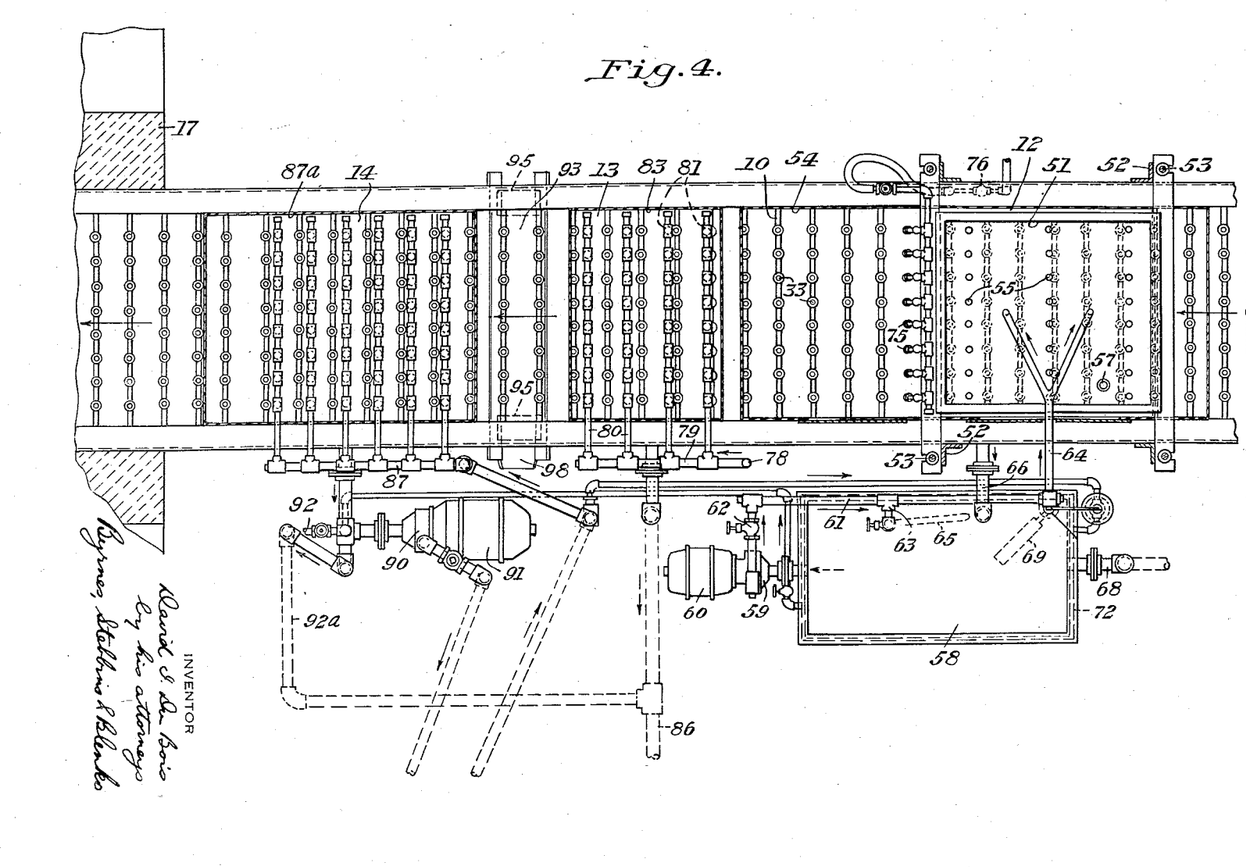
Figure 4 is a partial plan view to a scale similar to that of Figure 3.
Figure 5:
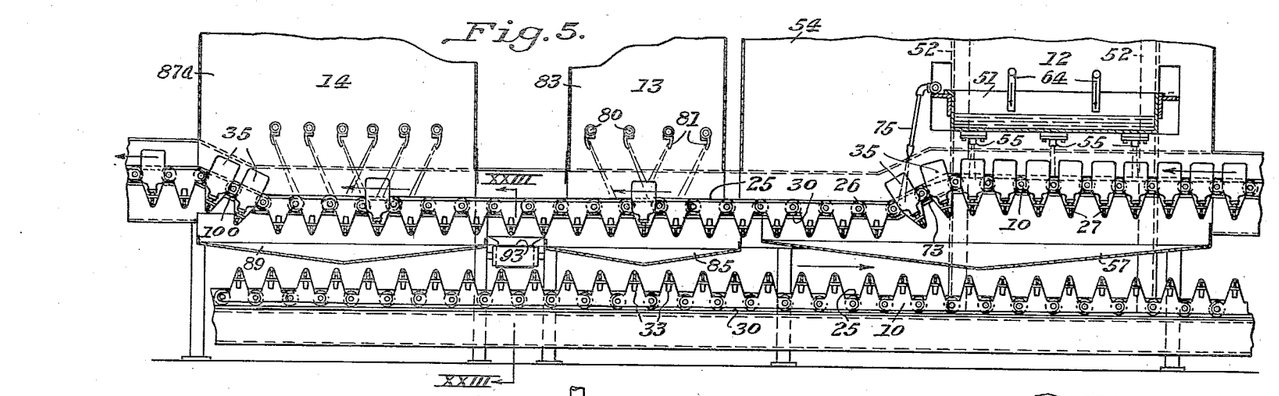
Figure 5 is a partial sectional view taken longitudinally through the central portion of the machine, showing parts in elevation.

At the station 13, the ware is subjected to a cold water washing spray. As shown more clearly in Figures 3 and 4, a cold water supply pipe 77 delivers water through a valve 78 to a header 79. Jet pipes 80 extending from the header 79 have spraying jets 81 spaced therealong, each spray pipe having an individual control valve 82. A hood 83 above the station 13 communicates with an exhaust fan 84 for the removal of any fumes. The wash water collects in a pan 85 and discharges through suitable connections to a waste pipe 86.

At the station 14, similar apparatus is provided for subjecting the ware to a hot water washing spray. Hot water is delivered from the heater 71 to a header 87 through suitable piping and a control valve 88. The arrangement of spray pipes, nozzles and control valves is similar to that at station 13, as is also the construction of a hood 87a connected to the fan 84. The hot wash water collects in a pan 89 and is returned to the heater 71 by a pump 90 driven by a motor 91. This pump also returns the water discharged from the heating jacket 72 to the heater. A make-up connection 92 permits the continuous admission of a controlled amount of fresh washing water to the hot water heater, insuring a clean spray at all times. A pipe connection 92a carries the overflow caused by the introduction of make-up water, to the pipe 86.

Figure 23:
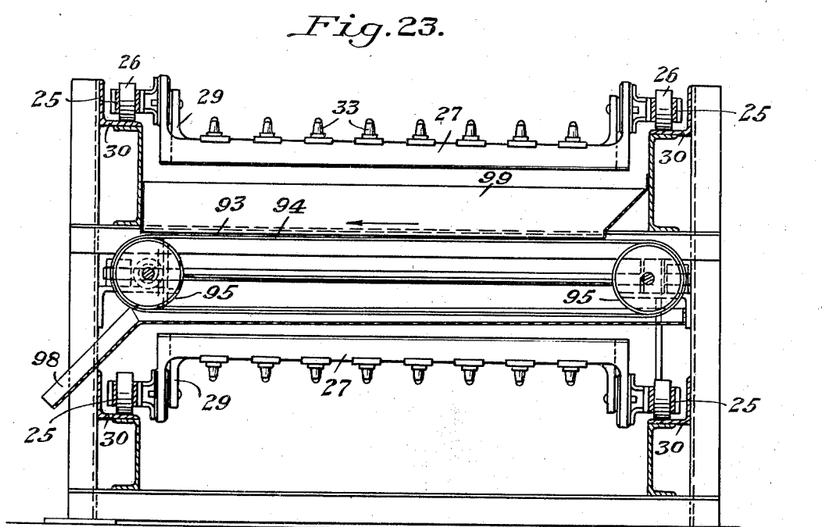
Figure 23 is a sectional view along the line XXIII—XXIII of Figure 5.
Figure 24:
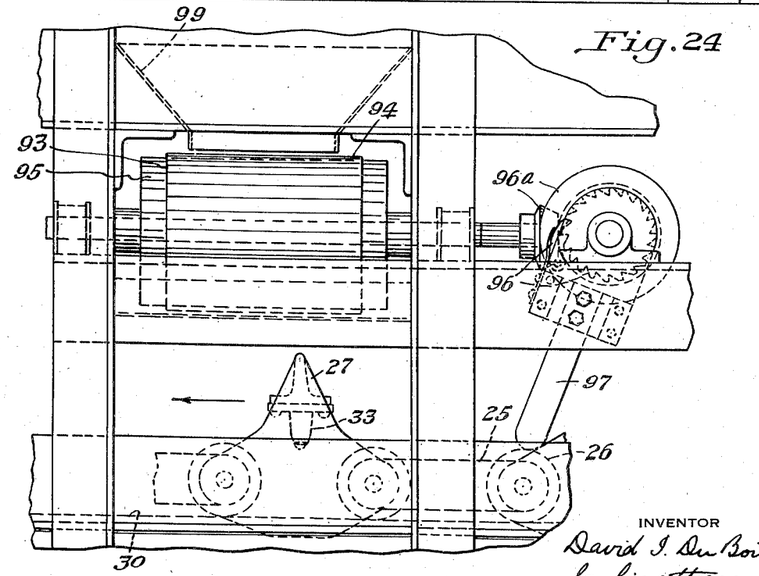
Figure 24 is a partial side elevation of the machine to enlarged scale showing a portion of the apparatus illustrated in Figure 23.

If desired, the shields 49 may be removed from the ware prior to entering the hot spray. The shields are removed by hand between the stations 13 and 14 and a conveyor 93 extends transversely beneath the conveyor 10 to carry the shields out to one side of the machine, the shields being dropped on the conveyor as they are removed from the ware. As shown in Figures 23 and 24, the conveyor 93 comprises a belt 94 trained over sheaves 95. A drive for one of the latter is shown in Figure 24 and comprises a ratchet and pawl mechanism 96 and a bevel gear drive 96a actuated by a swinging finger 97 adapted to be engaged by successive rollers 26 on the lower run of the conveyor chain 25.

It will be apparent that the oscillation of the finger 97 causes intermittent movement of the conveyor 93, resulting in the delivery of shields to a chute 98. A hopper 99 guides the falling shields onto the conveyor. The conveyor 93 is also useful in removing incrustations which form on the conveyor 10 during its passage through the station 12 and have a tendency to drop off while moving past the other stations.

Figure 6:
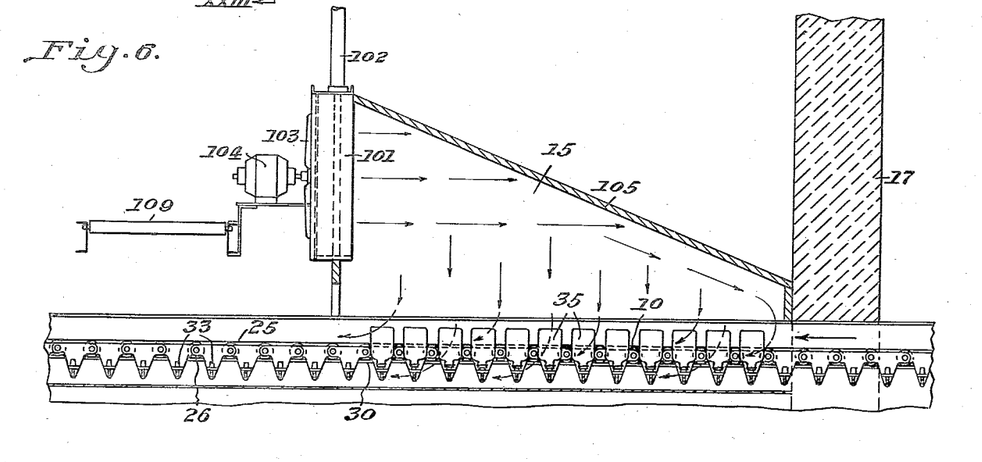
Figure 6 is a view similar to Figure 5 showing that portion of the apparatus adjacent the exit end.

On leaving station 14, the conveyor chain 10 passes over an upwardly inclined portion 100 of the track 30. As previously explained, this causes the drainage of any liquid collecting in the depressions in the bottoms of the ware. The conveyor then passes to the station 15 shown in Figure 6, wherein the ware is subjected to heated air currents for drying. A unit heater 101 having a steam connection 102, a fan 103 and a motor 104 is mounted above the conveyor 10. A deflecting housing 105 directs air currents set up by the fan 103 downwardly onto the ware emerging from the hot washing station. The ware is thus quickly dried and passes out to the exit end of the conveyor 16 where operators located at 106 remove the ware from the stands 33 and place it on conveyors 107. The conveyors 107 extend to packing tables 108 which rotate slowly. The ware is removed from the tables 108 and placed in cartons by packers. The cartons are then placed on a conveyor 109 for delivery to storage or shipping rooms.

I have found that atmospheric conditions in the area where the spraying operation is carried on affect the results to a considerable degree. For that reason, I provide unit heaters 110 at suitable points for delivering air at the proper temperature and humidity to the working space about the machine. The heaters 110 are similar to that shown at 101 and have connections to a steam header 111 which also supplies steam for the water heater 71.

It will be apparent from the foregoing description that the invention provides a method and apparatus for treating glassware to provide it with an etched surface finish, which are characterized by a high rate of production, uniformity of product, and avoidance of the exposure of operators to the effect of the fumes of the etching solution.

By maintaining the temperature of the etching solution at a constant value, uniformity of the product is further enhanced. Since the etching solution is constantly agitated, its strength is uniform throughout the storage and spray tanks. The method of delivering the solution to the ware contributes to economy, since only a small amount of the solution is actually carried away by the ware to the washing stations. The manual operations are limited to the placing of the ware on the conveyor and its removal therefrom. The etched ware is washed and dried before being turned out by the machine so that it is ready for immediate shipment. The exhaust fans remove fumes from the working space, and properly treated air is admitted thereto at the same rate so as to maintain a constant pressure.

By varying the length of the nipple forming the overflow port in the spray tank, the head of the spray solution can be varied to produce the desired length of jet spray. The spray tank itself, furthermore, is adjustable to accommodate ware of different heights.

Improved results are obtained by repeatedly subjecting the ware to the etching solution, as compared with the effect of a single dipping. I prefer to operate the conveyor so that the ware is exposed to the atmosphere for a definite time, for example, five times the immersion time, between successive sprays. The number of such sprays, of course, can be changed depending on the character of the ware and the desired finish.

While I have illustrated and described herein a preferred embodiment and practice of the invention, it will be apparent that many changes in the structure and operation may be made without departing from the spirit of the invention or the scope of the appended claims.

I claim:

1. The method of etching glassware and similar articles which includes the steps of continuously moving in a longitudinal direction a plurality of spaced groups of articles while conducting the following steps in the order mentioned: subjecting a group to a downwardly directed etching spray having a uniform temperature and strength, tilting the articles sufficiently to drain the etching solution off the articles and to cause a lateral downflow of the solution over the surface thereof, and simultaneously with the tilting, directing an air jet against the articles, passing the articles through a dripping and fume removing zone, subjecting the articles to a downwardly directed spray of cold water, passing the articles through a second dripping and fume removing zone, subjecting the articles to a downwardly directed spray of hot water, tilting the articles sufficiently to drain water off the tops of the articles, subjecting the articles to heated air currents for drying them, and thence, removing the ware.

2. Apparatus for etching glassware or similar articles comprising means for moving the ware, means for delivering a spray of etching solution thereto including a storage tank adapted to receive the solution after passing over the ware, a pump for delivering solution from said storage tank to said spray delivering means, said tank having an agitator jet also supplied by said pump whereby the contents of the tank are continuously agitated.

3. The method of etching the surfaces of articles having non-planar surface outlines such as jars and bottles which includes the steps of holding the articles in a substantially upright position with their mouth portions facing downwardly while continuously moving a plurality of spaced groups of articles and while successively subjecting the articles by groups to intermittently-applied etching operations, and to washing and drying operations.

4. The method of etching the surfaces of articles having non-planar surface outlines such as jars and bottles which includes the steps of closing off the mouth of each article and holding each article in a substantially upright position while continuously moving a series of articles in a longitudinal direction and while conducting the following steps in the order mentioned; subjecting each of the articles to time spaced applications of etching sprays of substantially uniform temperature and strength, tilting the articles sufficiently to drain off the etching solution and to cause a lateral flow of the solution over the surface thereof, passing the articles through a drip zone, subjecting the articles to washing sprays, tilting the articles sufficiently to drain off the washing solution, drying the articles, and thence removing the articles.

5. Apparatus for etching non-planar surface articles such as glassware or similar articles including a conveyor for continuously moving the ware, means on the conveyor closing off mouth portions of the ware and holding the ware in a substantially upright position during treatment portions of such movement, spray nozzles spaced along said conveyor, means supplying etching solution to some of said nozzles and washing solution to other of said nozzles, so that the ware is progressively etched and washed, and means for drying the ware after washing.

6. Apparatus for etching non-planar surface articles, such as glassware or similar articles, including a continuous conveyor for moving the articles in a substantially longitudinal path, means on said conveyor constructed and arranged to close off mouth portions of the ware and to hold the ware in a substantially upright position during treatment portions of such movement, at least a pair of spaced nozzles mounted along the conveyor supplying etching solution to each article at spaced timed intervals during the continuous movement thereof, and additional spray nozzles mounted along said conveyor and supplying washing fluids to successive articles after the articles have been subjected to the etching solution.

7. In a method of etching non-planar surface articles such as glassware, the steps of closing off a mouth portion of each article and holding each article in a substantially upright position while subjecting each article to successive spray applications of etching solution with a timed interval between the spray applications, and maintaining the etching solution in active circulation and at a substantially constant temperature, so that the ware will be uniformly treated to provide an improved surface finish thereon.

8. In a method of etching non-planar surface articles of ware, such as glassware and similar articles, the steps of closing off a mouth portion of each article and holding it in a substantially upright position while continuously moving a plurality of spaced groups of articles in a longitudinal direction and while conducting the following steps in the order mentioned; subjecting the outer surfaces of a group to at least two timed applications of etching spray having a suitable temperature and strength, tilting the articles to drain the etching solution and to produce a lateral downflow of the solution over the surface of the articles, subjecting the outer surface of the articles to a downwardly directed spray of hot water, tilting the articles to drain the water off the articles, and then drying the articles.

9. In a method of etching non-planar surface articles, such as glassware, the steps of closing off a mouth portion of each article and holding each article in a substantially upright position while subjecting each article to at least two successively-applied timed applications of downwardly-directed etching sprays.

10. In a method of etching non-planar surface articles, such as glassware, the steps of closing off a mouth portion of each article and holding each article in a substantially upright position while subjecting each article to timed-interval successively-applied etching-solution applications, and exposing each article to the atmosphere for a timed interval between such successive applications.

11. In a method of etching non-planar surface articles, such as glassware, the steps of subjecting each article to timed-interval successively-applied etching-solution applications, and exposing each article to the atmosphere for a timed interval between such successive applications, the exposure interval being substantially five times the application interval.

12. In an apparatus for etching non-planar surface articles such as glassware and similar articles, an etching treatment chamber, a conveyor for moving the ware through said treatment chamber, and means on said conveyor closing off mouth portions of the ware and holding the ware in a substantially upright position while it is being subjected to etching treatment in said chamber.

13. In a method of etching glassware and similar articles, the steps of moving the articles through an etching and gaseous atmospheric zone, supplying eaching fluid and a gaseous atmosphere to such zone, and successively treating the articles with etching fluid in such zone while holding the articles in a suitable treating position and while preventing the etching fluid from attacking inner surface portions of the articles, and successively subjecting the articles to gaseous atmospheric treatment between successive etching fluid treatments in such zone.

14. In a method as set forth in claim 13, the step of supplying etching fluid at a substantially uniform temperature and consistency at such zone.

15. In a method of etching glassware and similar articles, the steps of moving the articles through an etching zone, applying an etching medium to each article at multiple stations within such zone while holding the articles in a suitable treating position and preventing the etching medium from attacking inner surface portions of the articles, and exposing the articles to the atmosphere between such stations, the period of atmospheric exposure being substantially greater than the period of etching medium application.

16. In an apparatus for etching glassware and similar articles, an etching treatment chamber having a gaseous atmosphere, a conveyor constructed and arranged to move the ware through said treatment chamber, and means on said conveyor constructed and arranged to carry the ware and to prevent an entry of etching solution through mouth portions of the ware while it is being subjected to etching treatment in said chamber, and means intermittently subjecting the ware to etching fluid and then to gaseous atmospheric exposure within said chamber.

17. In an apparatus for etching glassware and similar articles, means for moving the ware, means for delivering a spray of etching solution to outer surface portions of the ware, means constructed and arranged to prevent delivery of etching solution to inner surface portions of the ware while outer surface portions are being treated, an air jet constructed and arranged to blow the solution from the outer surface of the ware after it has been moved past such spray means by said moving means, an air supply source for said jet, and an automatic control mechanism operably-timed to said moving means and being constructed and arranged to control the supply of air to said jet in accordance with the movement of said ware.

18. In a method of etching glassware and similar articles, the steps of intermittently applying etching solution to surface portions thereof while preventing the etching solution from attacking other surface portions thereof, and intermittently between etching applications while etching fluid is still thereon and before a washing solution application, exposing said first-mentioned surface portions to an atmosphere for a timed interval of longer duration than that of said intermittent solution applications.

DAVID IRVIN DU BOIS.